US011760579B2

(12) United States Patent
Rossetto

(10) Patent No.: US 11,760,579 B2
(45) Date of Patent: Sep. 19, 2023

(54) LINK FOR SUPPORT MEMBERS OF CONVEYOR BELTS, SUPPORT MEMBER OF CONVEYOR BELTS AND METHOD FOR MANUFACTURING A LINK

(71) Applicant: Incobra S.r.l., Padua (IT)

(72) Inventor: Stefano Rossetto, Mantova (IT)

(*) Notice: Subject to any disclaimer, the term of this patent is extended or adjusted under 35 U.S.C. 154(b) by 92 days.

(21) Appl. No.: 17/603,919

(22) PCT Filed: Apr. 17, 2020

(86) PCT No.: PCT/IB2020/053657
§ 371 (c)(1),
(2) Date: Oct. 14, 2021

(87) PCT Pub. No.: WO2020/212929
PCT Pub. Date: Oct. 22, 2020

(65) Prior Publication Data
US 2022/0297946 A1    Sep. 22, 2022

(30) Foreign Application Priority Data

Apr. 18, 2019   (IT) .......................... 102019000006102

(51) Int. Cl.
*B65G 17/40*   (2006.01)
*B65G 17/06*   (2006.01)

(52) U.S. Cl.
CPC ........... *B65G 17/40* (2013.01); *B65G 17/063* (2013.01); *B65G 2207/12* (2013.01); *B65G 2207/30* (2013.01)

(58) Field of Classification Search
CPC .............................. B65G 17/40; B65G 17/063

USPC ......................................... 198/778, 834, 848
See application file for complete search history.

(56) References Cited

U.S. PATENT DOCUMENTS

| 6,696,003 | B2* | 2/2004 | Cediel | B29C 45/0013 |
| | | | | 264/328.8 |
| 7,762,388 | B2* | 7/2010 | Lago | B65G 17/063 |
| | | | | 198/848 |
| 7,841,462 | B2* | 11/2010 | Layne | B65G 17/063 |
| | | | | 198/831 |
| 8,302,765 | B2* | 11/2012 | Lago | B65G 17/086 |
| | | | | 198/848 |

(Continued)

FOREIGN PATENT DOCUMENTS

WO    2015044712    4/2015

*Primary Examiner* — Douglas A Hess
(74) *Attorney, Agent, or Firm* — Themis Law

(57) ABSTRACT

A link for connecting supporting members used in conveyor belts, each supporting member being provided with a straight rod and the conveyor belt having a motion transmission member, includes a substantially U-shaped main body configured to be removably anchored to a respective straight rod. The main body is made of a metallic material and has a closed front portion and an open back portion provided with a pair of mutually facing end sections. At least one of the end sections is covered with a polymeric material and joined therewith in a permanent manner, a portion of the outer surface of the polymeric material covering the end section being adapted to selectively interact with the motion transmission member. A supporting member for a conveyor belt, and a method of making a connection link for supporting members of conveyor belts.

5 Claims, 6 Drawing Sheets

(56) References Cited

U.S. PATENT DOCUMENTS

| | | | |
|---|---|---|---|
| 8,985,318 B2* | 3/2015 | Neely | B65G 17/083 |
| | | | 198/853 |
| 9,371,190 B2* | 6/2016 | Rettore | B65G 17/086 |
| 9,440,793 B2* | 9/2016 | Matsuzaki | B65G 17/086 |
| 9,540,176 B2* | 1/2017 | Matsuzaki | B65G 23/06 |
| 10,577,183 B2* | 3/2020 | Perdue | B65G 23/06 |
| 11,305,938 B2* | 4/2022 | Salsone | B65G 21/18 |
| 2009/0218199 A1 | 9/2009 | Russell | |
| 2015/0353285 A1 | 12/2015 | Matsuzaki | |

* cited by examiner

# LINK FOR SUPPORT MEMBERS OF CONVEYOR BELTS, SUPPORT MEMBER OF CONVEYOR BELTS AND METHOD FOR MANUFACTURING A LINK

FIELD OF APPLICATION OF THE INVENTION

The present invention can be applied in the technical sector of conveyor belts and more specifically of conveyor belts designed for handling food products.

More specifically, the present invention concerns a connection link, a supporting member for conveyor belts using said link and a method for making the connection link.

STATE OF THE ART

As is known, conveyor belts have been used for a long time in many technical sectors in order to facilitate the movement of a series of items along a predetermined forward direction.

Conveyor belts have a surface designed to support the items that need to be transported and a member for transmitting motion, typically a toothed belt or a gear wheel, connected to one or more electric motors and suited to interact with the supporting surface in such a way as to promote its controlled movement along the forward direction.

In a specific type of conveyor belts used in the food industry, the supporting surface is replaced by a structure made up of metal rods arranged side by side and spaced at substantially regular intervals along the forward direction.

More specifically, these belts are constituted by a plurality of modular supporting elements (or inserts), each one of which is constituted by a conveniently shaped link designed to interact with the motion transmission member, and by a corresponding rod that has been removably anchored to said link.

In this sector, conveyor belts are usually made according to two particular design configurations commonly known as drum belt or positive drive belt.

Drum conveyor belts have one or more cylinders designed to be operatively associated with driving means, so that they can serve as motion transmission members.

More specifically, these cylinders rotate around their central development axis and are provided with a shaped external wall, so that they interact with the links of each supporting element; in this way, the drum transmits motion to the supporting element, transforming the rotational motion into a translational motion along the forward direction.

Some positive drive conveyor belts are configured to promote the movement of the product at a substantially constant level; however, other types of positive drive belts are designed to distribute the inserts along a helical path that develops vertically in such a way as to lift the products from a lower position to an upper position during the forward movement of the belt.

At each helix along the path there is a gear wheel driven by a single shaft that is operatively associated with an electric motor.

Each gear wheel is designed to mesh with the corresponding link of each supporting element, in such a way as to promote its movement along the helical path.

The links of conveyor belts can be generally made of two materials: metallic (steel) or polymeric.

Steel links can withstand rather high tensile loads and are particularly suitable for use in positive drive belts.

In this type of link, the rod is joined through a weld designed to define a permanent connection between these two elements, which can be successively separated in two possible ways: following the breaking of the rod or following the removal of the weld bead.

The main drawback of the metal links and of the inserts using these components thus lies in that their maintenance is rather difficult, since the replacement of the link only or of the rod only requires complex operations for removing/restoring the weld and these procedures cannot always be carried out during operation, especially when the belt is used in food processing systems.

A further drawback of the links and inserts made of a metallic material is represented by the fact that they are very noisy, due to the rubbing between the link and the metal wheel, which is made of steel, too.

In order to overcome these drawbacks, inserts and/or links for conveyor belts completely made of a polymeric material have been developed.

The components made of a polymeric material have a low friction coefficient and therefore are light and not very noisy.

Furthermore, a link made of a polymeric material is joined to a metal rod through the use of convenient connection means designed to promote a stable (but at the same time removable) connection between these two components.

Consequently, the maintenance of this type of inserts is rather rapid and comfortable for a technician expert in the art and, furthermore, it is important to underline that the replacement and/or repair activities do not contaminate the environment.

However, the links made of a plastic material are rather fragile and their mechanical resistance is much lower than that of steel links, consequently it is highly recommended not to use them in positive drive conveyor belts, where tensile loads are rather high.

In order to overcome these drawbacks, links for conveyor belts made of the two materials have been designed, meaning links having a metal part suited to withstand high tensile loads and a part made of a polymeric material suited to interact with the motion transmission member.

Document EP2895407 describes a connection link of a lateral chain for conveyor belts, particularly for food products, comprising a substantially U-shaped body whose front portion is shaped in such a way that it can be inserted between the two ends of the back portion of an identical connection element located in front of it. The front portion is provided with two symmetrical slits that extend longitudinally to allow the passage and travel of an end portion of a rod of a conveyor belt, while the back portion is provided with a hole for the insertion of an end portion of a further rod element. Furthermore, the back end has a lateral shaped tab designed to mesh with a gear wheel and has a lateral anti tilt wall. The connection is constituted by two parts that are mutually connected through reversible fixing means, that is, a first part comprising the substantially U-shaped body and a second part comprising the lateral tab and the lower lateral anti tilt wall. The specific characteristic of this link is represented by the fact that the reversible fixing means are constituted by a flat tab projecting towards the outside of the conveyor belt in the configuration for use, wherein said flat tab is suited to snap in a corresponding seat formed in the second part. Finally, the second part is completely made of a polymeric material, while the U-shaped body is completely made of a metallic material.

The main drawback of this solution lies in that said link, though making it possible to overcome the drawbacks described above, has a rather complex configuration, since it is necessary to provide snap-on anchorage means suited to promote the stable connection between the metal portion and the polymeric portion.

A further drawback of this solution is represented by the fact that this link has limited mechanical stiffness.

The low stiffness of the component makes it difficult to contain the bending action to which the metal body is subjected following the application of the torsional loads acting on the same during the operation of the belt, and this can give origin to seizures and/or reduce the sliding ability of the link.

Another drawback of this solution lies in that it is rather costly, due to the fact that it has a high number of components that must be constructed and assembled together.

Again, a further drawback of this solution lies in that the connection of the portion made of a polymeric material with the metal body is relatively weak and is subject to breakage (total or partial) due to the high loads that are applied to this part of the link during the operation of the belt.

Documents US 2015/353285 and WO 2015/044712 describe conveyor belts for food products having all the technical characteristics mentioned in the preamble of claim 1. However, even these documents highlight the drawbacks illustrated with regard to the previously described solution.

Presentation of the Invention

The present invention intends to overcome the technical drawbacks mentioned above by providing a connection link for supporting members used in conveyor belts that is very simple to construct.

It is a further object of the present invention to provide a connection link having high mechanical resistance and thus capable of withstanding the stress acting on it for long time intervals.

It is another object of the present invention to provide a connection link that is relatively economical and constituted by a reduced number of components.

Again, it is a further object of the present invention to provide a connection link characterized by long duration and reduced noise during use in a conveyor belt.

It is another object of the present invention to provide a connection link with permanent connections between some of its components, thus minimizing the risk of the same being damaged or coming off during use.

These objects, together with others that are highlighted in greater detail below, are achieved by a connection link for supporting members for conveyor belts of the type according to claim 1.

Other objects that are described in greater detail below are achieved by a connection link for supporting members for conveyor belts according to claims from 2 to 6.

According to a further aspect of the present invention, a supporting member for conveyor belts of the type according to claim 7 is provided.

This supporting member offers all the advantages already described above with reference to the link and some further objects of the same are clarified below according to the technical characteristics specified in the dependent claims from 7 to 14.

Again, according to a further aspect of the present invention, a method for making a connection link for supporting members for conveyor belts according to claim 15 is provided.

BRIEF DESCRIPTION OF THE DRAWINGS

The advantages and the characteristics of the present invention will clearly emerge from the following detailed description of some preferred but non-limiting configurations of a connection link and a supporting member for conveyor belts, with particular reference to the following drawings.

Figure 3:
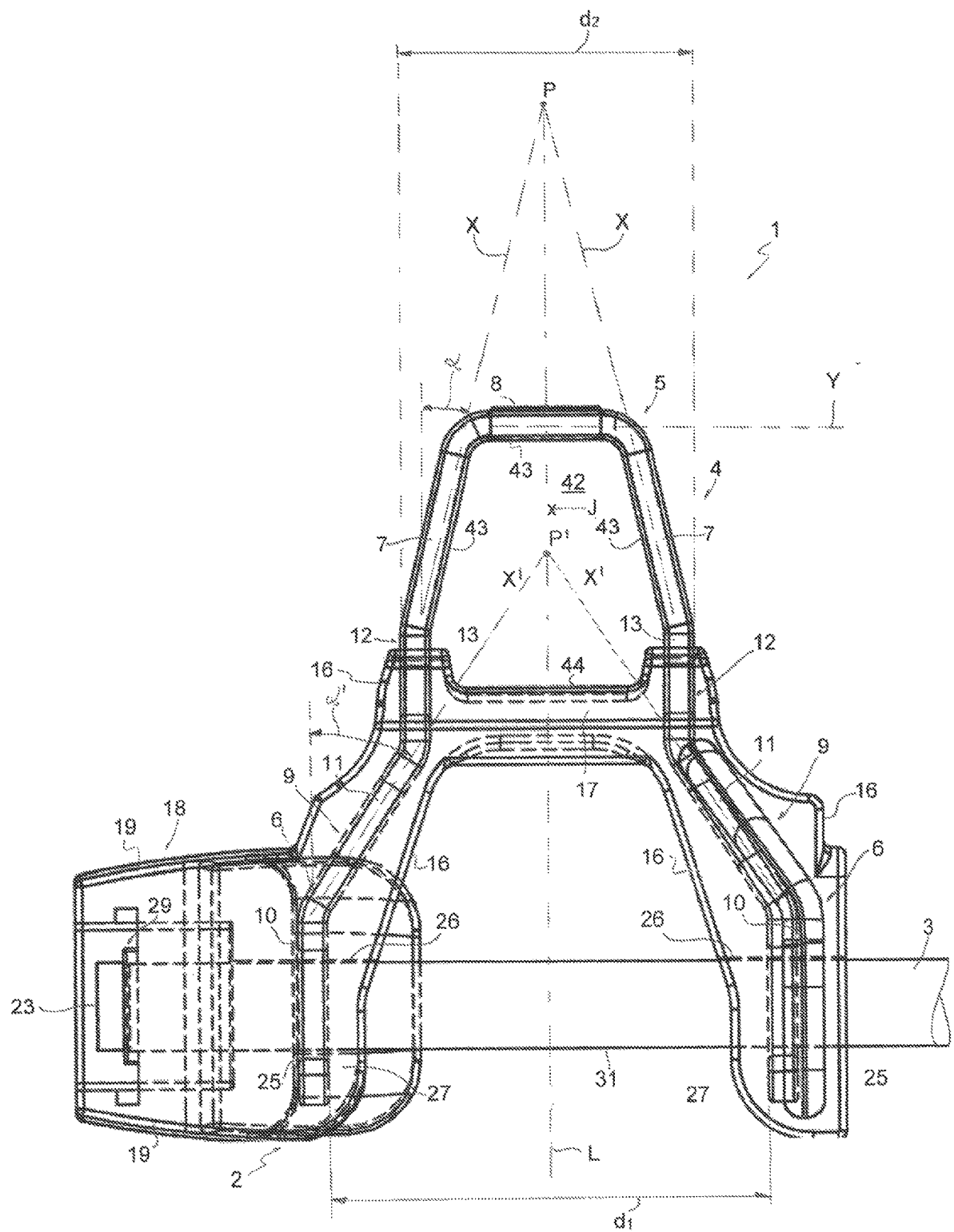
FIG. 3 shows a top view of a supporting member of FIGS. 2A and 2B including a connection link that is the subject of the present invention.
Figure 5A:
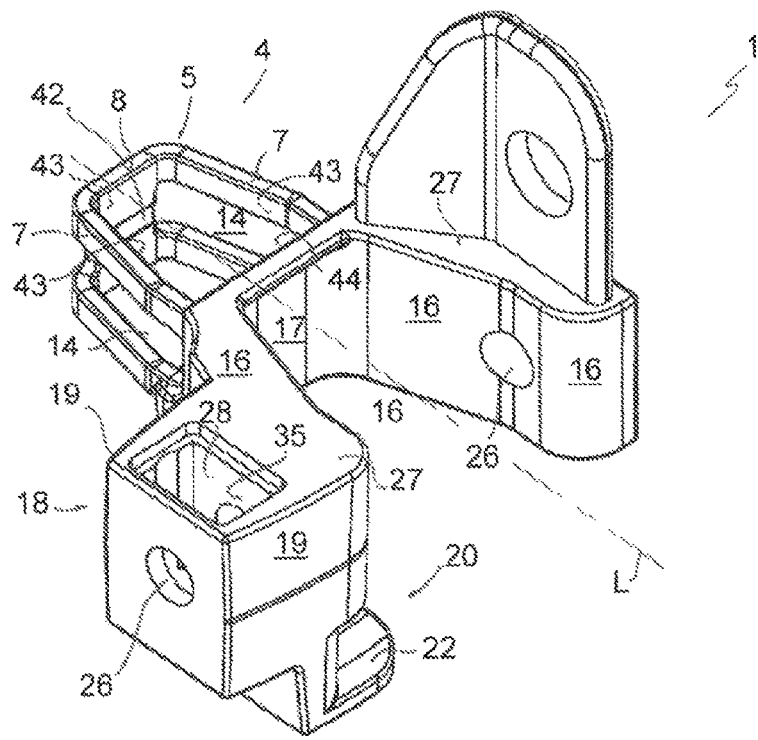
Figure 5B:
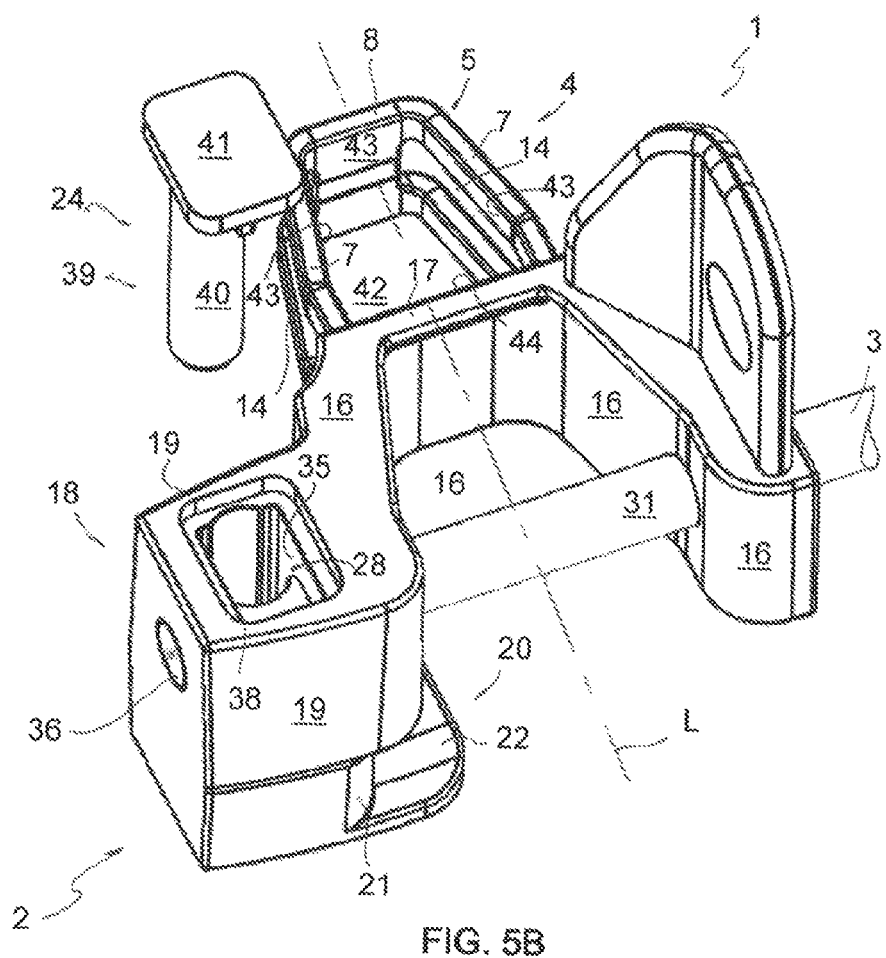

FIGS. from 4A to 4C show two full perspective views and a partially sectioned perspective view of a supporting member and of a connection link made according to a second configuration different from the configuration visible in FIG. 3;

FIGS. 5A and 5B show respective perspective views of a connection link and of a supporting member made according to a third configuration.

DETAILED DESCRIPTION OF THE INVENTION

The subject of the present invention concerns a connection link 1 and a supporting member 2 designed to be used in conveyor belts.

Figure 1A:
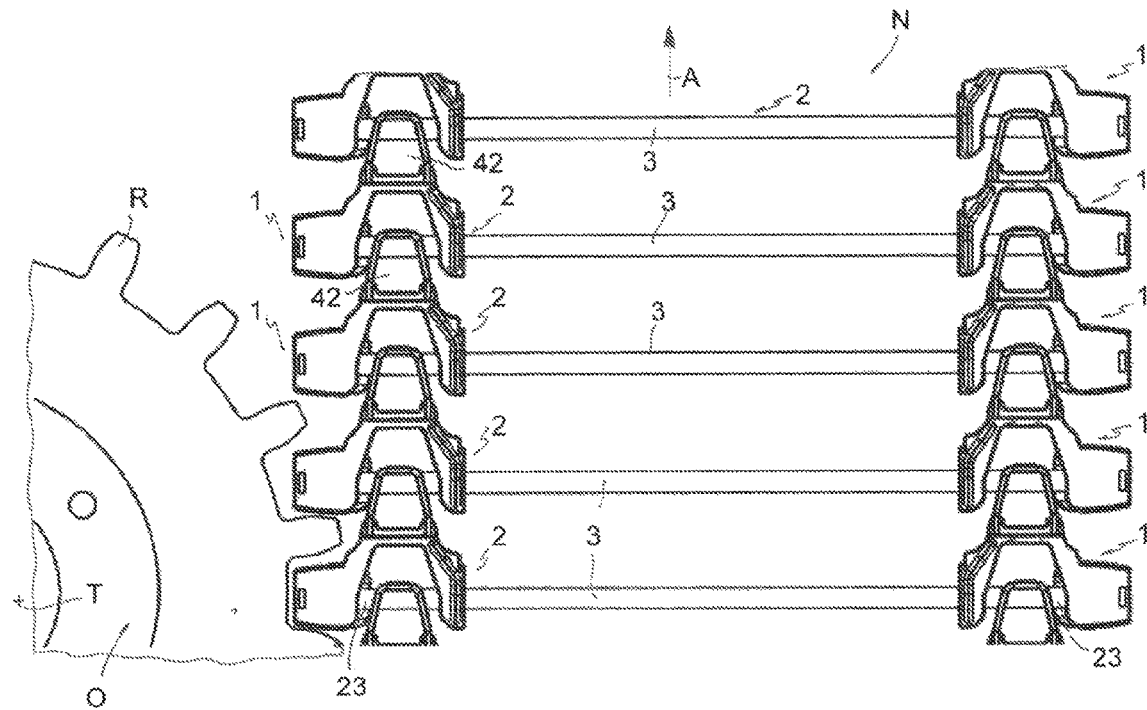
FIGS. 1A and 1B respectively show a top view and a perspective view of two different configurations of conveyor belts used for moving food products.
Figure 1B:
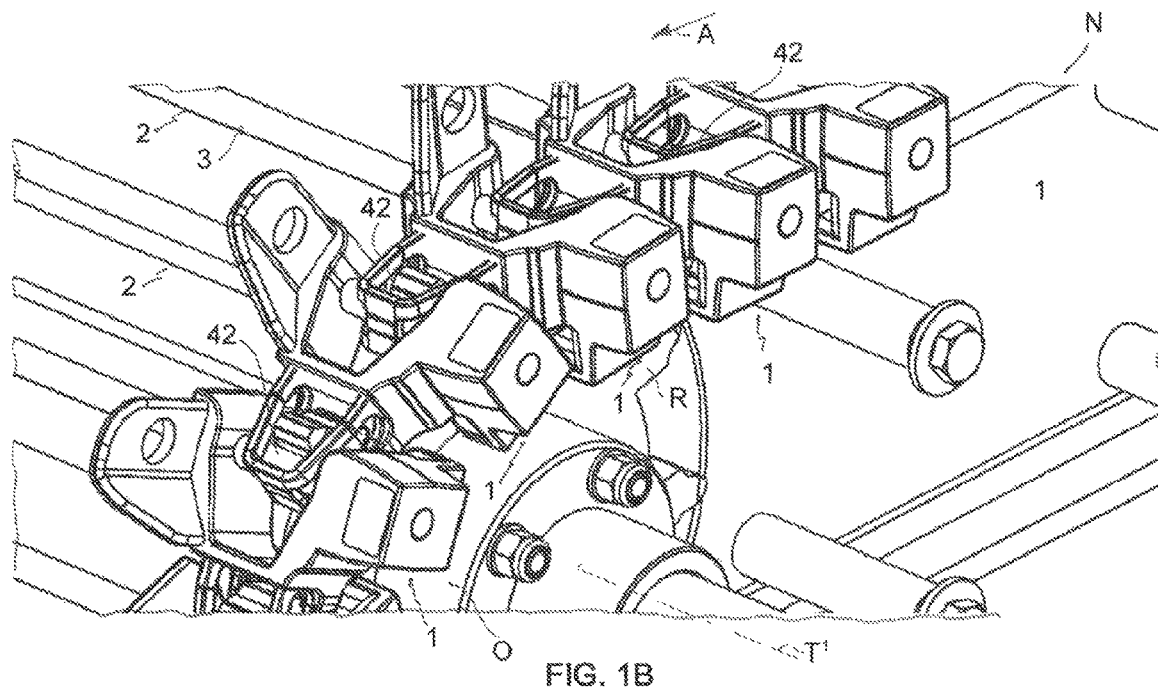

More specifically, FIGS. 1A and 1B show partial views of a conveyor belt N designed to move finished or semi-finished food products.

As already explained, these belts N are constituted by a plurality of supporting members 2 which are configured to support the food products during their movement along a forward direction A. The belt N, furthermore, includes the use of a motion transmission member O operatively associated with a respective electric motor (not visible in the drawings). Said member O is configured to selectively interact with the supporting members 2 in such a way as to promote their advance movement along the forward direction A.

The supporting members comprise respective elongated and straight rods 3 which extend in a direction that is substantially orthogonal to the forward direction A and are substantially positioned side by side in such a way as to define a supporting area P for the objects that have to be transported by the belt N.

In the belt N schematically shown in FIG. 1A, the motion transmission member O is constituted by a gear wheel R selectively revolving around a substantially vertical rotation axis T.

Even in the belt schematically shown in FIG. 1B the motion transmission member O is constituted by a gear wheel R selectively revolving around a substantially horizontal rotation axis T'.

As will be better clarified further on in this description, the supporting member comprises a connection link 1 that substantially serves two functions: firstly, it is configured to promote the removable connection of the respective straight rod 3, and secondly it is configured to selectively interact with the motion transmission member O, so as to allow the supporting members 2 to advance along the direction A.

FIGS. from 3 to 5B clearly show a connection link 1 that is the subject of the present invention.

The link 1 comprises a substantially U-shaped main body 4 configured to allow the anchorage of a respective rod 3 of the belt N.

More specifically, the main body 4 extends along a longitudinal development axis L and has a closed front portion 5 and an open back portion 6.

As clearly visible in FIG. 3, the closed front portion 5 of the main body 4 is U-shaped, too, and is defined by one pair of rectilinear segments 7 oriented along respective directions X that are inclined with respect to the development axis L.

These two segments 7 are mutually joined by a further front segment 8 extending along a substantially transverse direction Y that is orthogonal to the development axis L.

The open back portion 6 is constituted by one pair of end sections 9 arranged in a mutually facing position.

Each end section 9 is the result of the union of two respective segments, the first one of which is substantially longitudinal (and indicated by the reference number 10) and connected to a further segment (indicated by the reference number 11) arranged along a respective direction X' slightly inclined with respect to the development axis L.

More specifically, in the configuration of the link 1 illustrated in the Figures, the directions X, X' along which the inclined segments 7, 11 extend mutually converge towards corresponding convergence points P, P' situated on the development axis L.

Furthermore, the inclination angle α of the directions X along which the segments 7 constituting the front portion 5 are oriented is smaller than the inclination angle α' of the directions X' along which the segments 11 that constitute the back portion 6 are oriented.

As clearly visible in FIG. 3, the longitudinal segments 10 of the end sections 9 are substantially parallel to each other and separated by a predetermined distance $d_1$.

The front portion 5 has a predetermined maximum width $d_2$ measured at the ends of the respective inclined segments 7 (in this regard, see FIG. 3).

Conveniently, the distance $d_1$ that separates the longitudinal sections 9 of the back portion 6 is longer than the maximum width $d_2$ of the front portion 5, as during operation of the belt N the front portion 5 of a link 1 will be suited to be at least partially inserted in the inner space delimited by the back portion 6 of a preceding link 1.

Figure 2A:
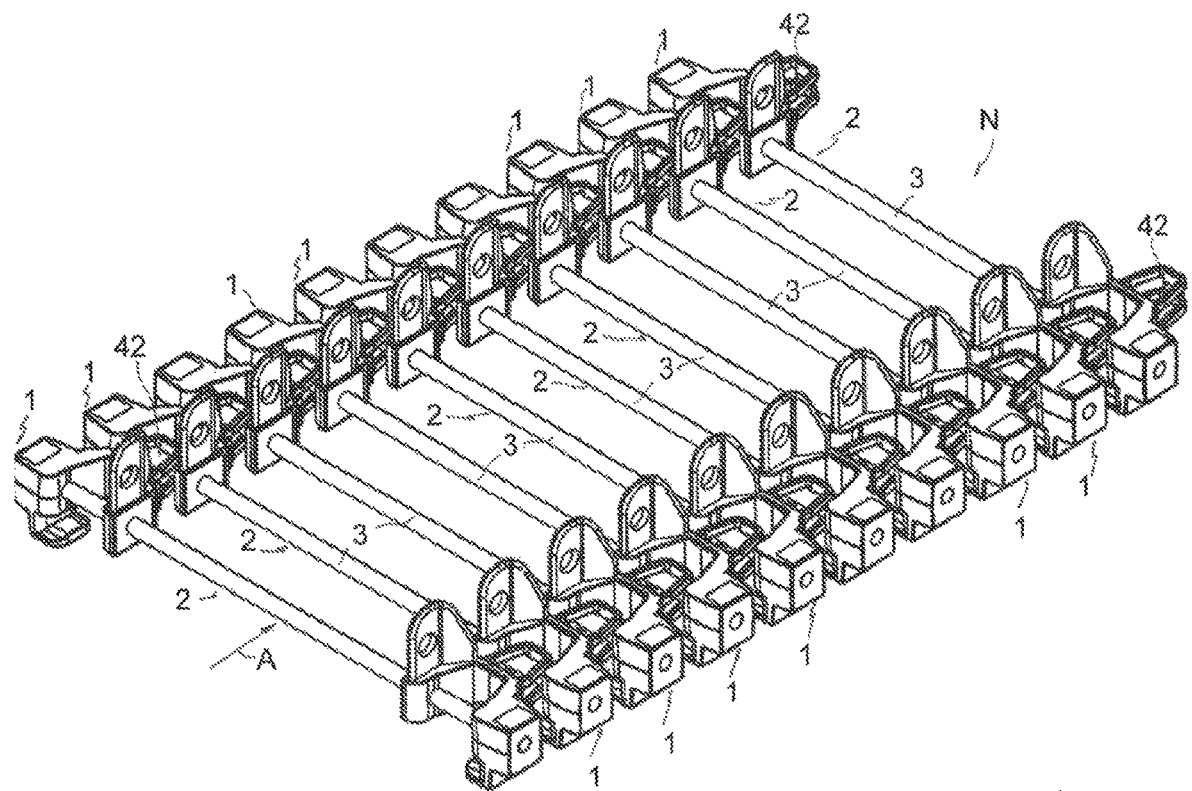
FIGS. 2A and 2B respectively show perspective views of a series of supporting members, which are the subject of the present invention, of the type used in the conveyor belts illustrated in FIG. 1A and FIG. 1B.
Figure 2B:
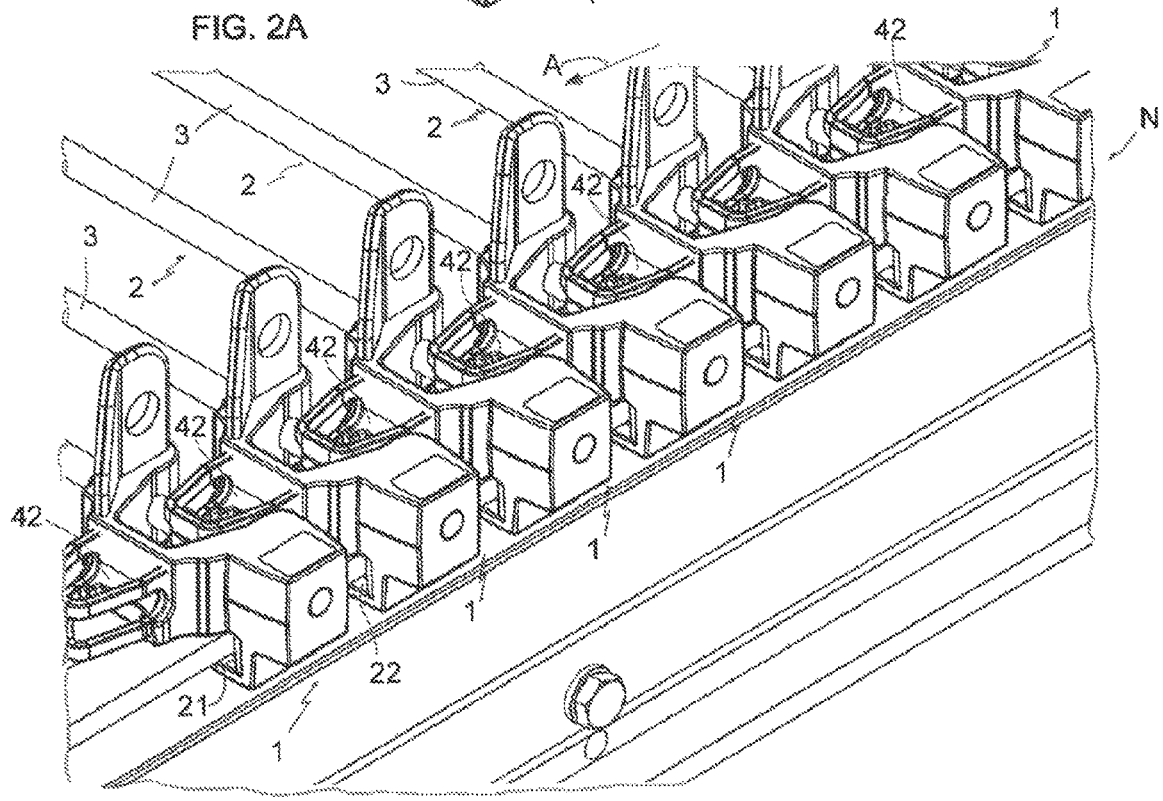

This condition is clearly visible in FIG. 2A and in FIG. 2B.

In other words, the choice to form the main body 4 substantially in the shape of a U is due to the fact that the plurality of links 1 used in the belt N are partially inserted in one another even if they always remain mutually spaced during their advance movement along direction A.

The main body 4 can also comprise a connecting portion 12 suited to connect the front portion 5 and the end sections 9 of the back portion 6 to each other.

More specifically, the connecting portion 12 can be constituted by one pair of further straight (and substantially longitudinal) segments 13 whose ends are joined to the ends of the inclined segments 7, 11 of the front portion 5 and of the back portion 6.

Conveniently, as better visible in FIGS. from 4A to 5B, the front portion 5 is provided with two slits 14 that are aligned longitudinally.

The width w of the slits exceeds the thickness s of the rod 3 in such a way as to allow the passage of the latter with the respective clearance.

More specifically, the slits 14 can be made on the inclined segments 7 that constitute the front portion 5.

As better visible in FIGS. from 1A to 2B, the slits 14 of a corresponding link 1 defining a supporting member 2 are suited to allow the insertion of the rod 3 associated with the supporting member 2 arranged before said rod 3.

In this way, all the supporting members 2 will be engaged with each other due to the insertion of the rods 3 in the corresponding slits 14 obtained on the links 1.

In this way, it is possible to make a chain (or series) of supporting members 2 connected to one another through the engagement of each rod 3 of a given member 2 with the slit 14 formed on the link 1 of a successive member 2.

Conveniently, the main body 4 is made of a metallic material (and therefore so are the front portion 5, the back portion 6 and the connecting portion 12).

For example, the main body 4 can be formed starting from a piece of metal section bar with rectangular cross section and a predetermined thickness.

The section bar, furthermore, can be subjected to a shearing operation intended to obtain the pair of slits 14, which can be followed by a further pressing operation intended to form the main body 4 substantially in the shape of a U.

According to a specific aspect of the invention, at least one end section 9 of the main body 4 is covered with a polymeric material suited to define with the latter a stable and permanent connection. In other words, the polymeric material cannot be removed from the corresponding end section 9 without causing the destruction of the link 1.

More specifically, the polymeric material can be laid on the section 9 (or the end sections 9) of the back portion 6 of the main body 4 through a co-moulding process.

For example, the polymeric material can be laid through an injection moulding process.

The union between the polymeric material and the metallic material of the body 4 will thus be particularly strong, since the two materials can be selected in such a way that they are chemically compatible and thus define a substantially long lasting and permanent bond.

Figure 4A:
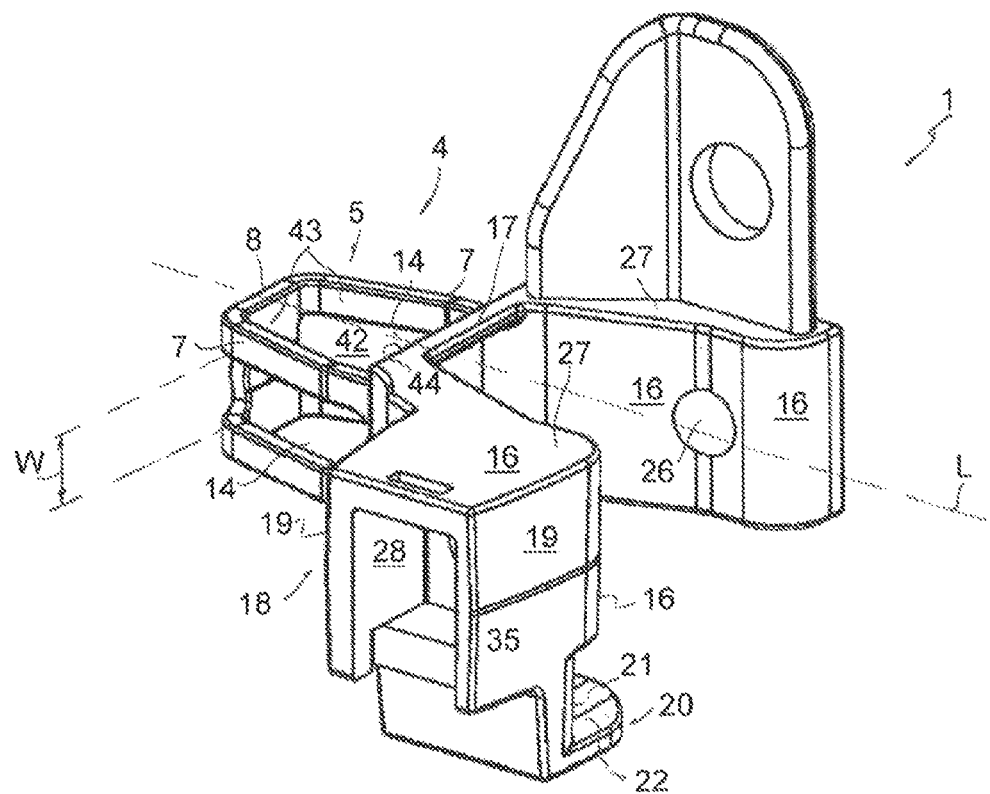
Figure 4B:
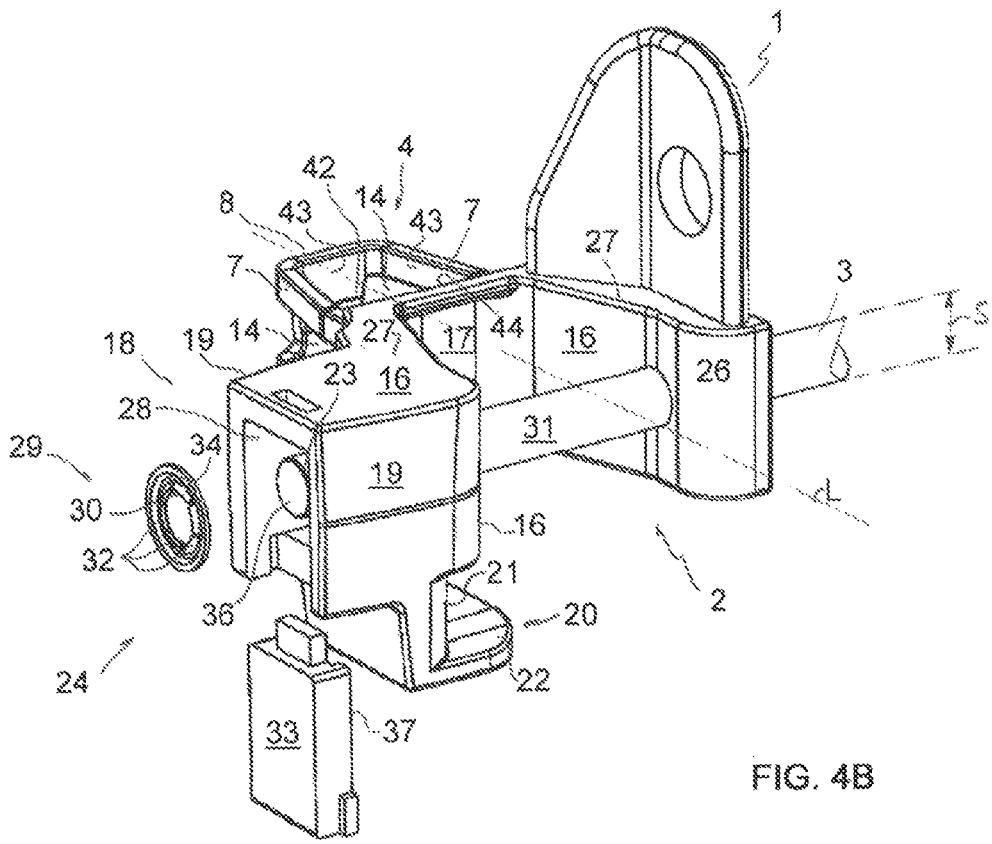

FIG. 4B shows a cross section of the link 1 with respect to a vertical section plane. In this Figure it is possible to observe how the respective end sections 9 of the body 4 substantially serve as a core for the polymeric material with which they are covered, so as to produce a particularly stable and resistant assembly whose overall mechanical stiffness is rather high and suited to withstand all the loads acting on the link 1 and generated during the operation of the belt N.

Preferably, as better visible in the configuration of the link 1 illustrated in the Figures, both the end sections 9 of the back portion 6 of the body 4 are covered with the polymeric material.

In this way, it will be possible to promote the formation of an outer surface 16 made of polymeric material 16 developing over the entire extension of the back portion 6 of the main body 4.

Advantageously, a reinforcement wall 17 made of a polymeric material can be provided, said wall 17 being suited to join the polymeric material areas that cover the end sections 9 of the main body 4 to each other.

The reinforcement wall 17 will make it possible to increase the mechanical stiffness of the whole link 1, as its presence considerably limits the risk of deformations towards the inside and/or towards the outside of the end sections 9 of the open back portion 6 being produced due to the effect of the tensile loads generated during the movement of the supporting members 2 along the forward direction A.

In other words, the presence of the reinforcement wall 17 will make it possible to stiffen the structure of the link 1 and of the supporting member 2, with evident benefits in terms of sliding ability of these members during the operation of the conveyor belt N.

Preferably, as better visible in the Figures, the reinforcement wall 17 can be positioned, along the longitudinal direction, substantially at the level of the connecting portion 12 that connects the front portion 5 to the back portion 6 of the main body 4.

As clearly visible in FIGS. 1A and 1B, the position of the reinforcement wall 17 is selected in such a way as to allow the front portion 5 of a link 1 to be inserted without difficulties in the back portion of a preceding link 1.

Conveniently, the front portion 5 may comprise an opening 42 having the following characteristics: it is a through opening with respect to a substantially transverse direction J that is orthogonal both to the development direction L and to the direction Y of the front segment 8.

The opening 42 and the transverse direction J are both visible in FIG. 3 (the direction J is indicated by the symbol "x", being directed perpendicularly outwards with respect to the sheet).

A part of the opening 42 can be delimited by the inner surface 43 of the main body 4 which constitutes the closed front portion 5, while the remaining part of the opening 42 can be delimited by the peripheral surface 44 of the reinforcement wall 17.

More specifically, the opening 42 can be respectively delimited by the inner surface 43 of the rectilinear segments 7 and of the front segment 8 and by the peripheral surface 44 of the reinforcement wall 17 facing towards the front segment 8.

The presence of the opening 42 makes it possible to reduce the overall weight of the link 1 and this lightening effect can be particularly advantageous in the case of very long conveyor belts N made using dozens (or thousands) of connection links 1.

Furthermore, as better illustrated in FIG. 1B, a further function of the opening 42 is to allow the partial insertion (inside the same opening) of a tooth of the gear wheel R when the latter revolves around a substantially horizontal rotation axis T'.

The interaction between the tooth and the inner surface 44 of the main body 1 (in particular the inner surface 43 of the front segment 8) will make it possible to transfer motion from the member O to the connection links 1, in such a way as to promote the movement of the belt N in the forward direction A.

As clearly visible in FIGS. from 1A to 5B, the polymeric material can define an outer surface 16 shaped in such a way as to define a transverse projection 18 designed to interact with the motion transmission member O.

More specifically, this projection 18 can extend mainly along a transverse direction and can have one pair of peripheral surfaces 19 designed to come selectively into contact with the teeth of the transmission member O of the belt.

The peripheral surfaces 19 of this projection 18 can have the same shape as that of a tooth with involute profile (or commonly known as "barrel-shaped") in such a way as to improve the contact angle that is defined between the tooth of the member O and this projection 18.

As better illustrated in FIGS. 3, 4A, 4B, 4C, 5A and 5B, the transverse projection 18 can be hollow.

A side 20, made of a polymeric material and extending under the projection 18 substantially according to the shape of an "L", can also be provided.

The side 20 has one pair of inner surfaces 21, 22 substantially perpendicular to each other and suited to slide on the outer surfaces of a rectilinear guide G, as better visible in FIG. 2B.

The sliding movement of the side 20 on the guide G makes it possible to limit the lateral movement of the connection link 1 and of the supporting member 2 during the operation of the belt N.

As already mentioned above, the invention concerns also a connection support 2. This element is visible in FIGS. from 1A to 5B.

More specifically, each supporting member 2 is constituted by three distinct members: at least one link 1, a straight rod 3 suited to be anchored to the link (or links) 1 and means 24 for removably anchoring the rod 3 to the link (or the links) 1.

Conveniently, the connection link 1 used in a supporting member can be of the type described in previously and can therefore comprise an opening 42 situated in the front portion 5 of the main body 4.

The opening 42 can allow the at least partial insertion of a tooth of the gear wheel R, so as to allow the selective interaction between the outer surface of the latter and the inner surface 44 of the main body 4 (meaning the inner surface 43 of the front segment 8).

The rod 3 has a substantially circular cross section and can be obtained from a piece of metal section bar.

The configuration of the supporting member 2 visible in FIGS. 1A and 2A includes the use of one pair of links 1 removably anchored to the ends 23 of a single rod 3.

In FIGS. 1B, 3, 4B-5B, however, only one link 1 is visible, even if it is understood that these views are partial and that for each supporting member two respective links must be used.

The anchorage means 24 comprise two respective pairs of holes 25, 26 visible in FIG. 3 and respectively formed in the end sections 9 of the main body 4 and in the wall 27 of the polymeric material that covers these metal sections 9.

These two pairs of holes 25, 26 (formed in the body 4 and in the polymeric wall 27 of the unit assembly) are aligned longitudinally, so as to allow the sliding insertion of the rod 3 inside them.

Furthermore, the position of the holes 25, 26 can be selected in such a way that they are aligned with the cavity 28 of the projection 18, so as to allow the insertion of the end portion 23 of the rod 3 inside the same cavity, as can be seen in FIGS. 3, 4B, 4C and 5B.

Figure 4C:
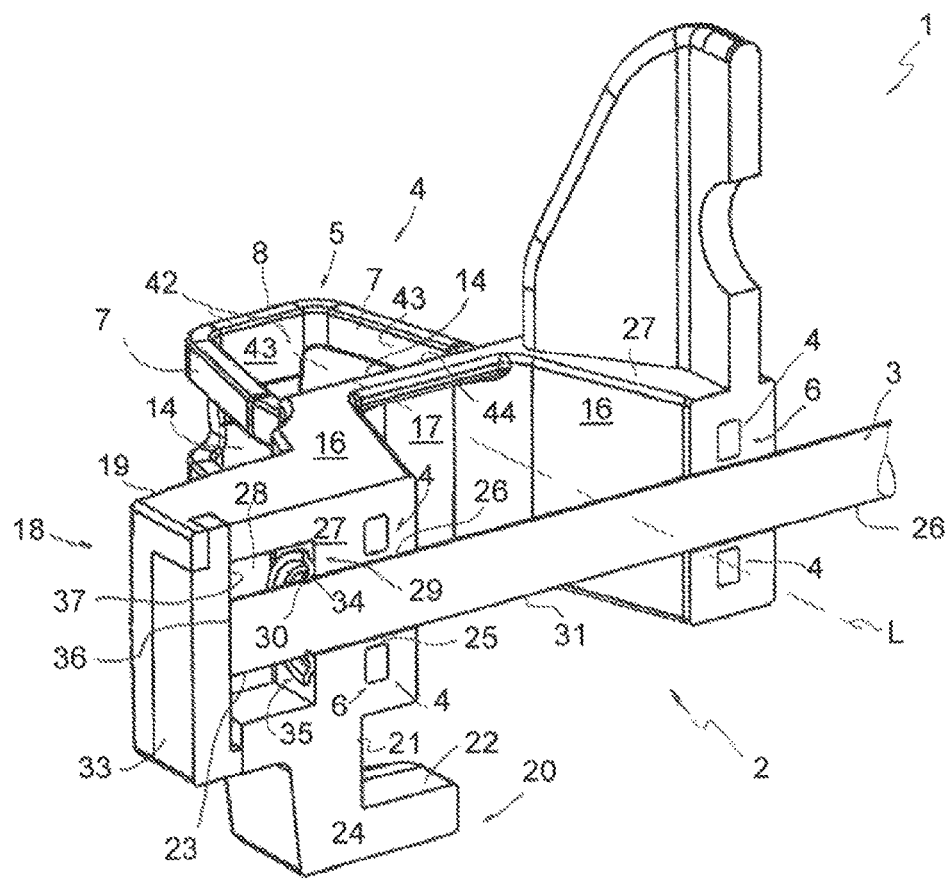

A first configuration of the anchorage means 24 visible in FIGS. 3, 4B and 4C includes a substantially annular holding member 29 provided with an inner edge 30 shaped in such a way as to match the outer surface 31 of the rod 3.

In the case illustrated in the Figures, the inner edge 30 is substantially circular and is at least partially elastic, so as to interact differently with the rod 3 when the latter is inserted in or extracted from the hole of the annular holding member 29.

More specifically, the rod can be held owing to the particular configuration of the inner edge 30 of the holding member 29. Said edge 30, in fact, is divided into circular sectors 32 that behave in a different manner according to the sliding direction of the rod: along a given sliding direction they allow the free insertion of the rod 3, while along the opposite sliding direction their interaction with the outer surface 31 of the rod 3 is such as to lock it.

Therefore, it is possible to identify a free sliding direction (insertion) of the rod 3 in the holding member 29 and an opposite locking direction (or anti extraction) of the rod 3 with respect to said holding member 29.

The sectors 32 of the inner edge 31 are slightly bent towards the outside, as can be seen in FIG. 4B and in FIG. 4C, in such a way as to allow the insertion of the rod 3 in a sliding direction that causes it to be bent in the same direction (meaning towards the outside).

The annular holding member, instead, locks the edge 30 on the outer surface 31 of the rod 3 when the sliding direction of the latter is such as to recall the elastic sectors 32 of the edge 30 itself towards the inside.

A polygonal block 33 can also be provided, wherein said polygonal block 33 is made of a polymeric material and is suited to close the cavity 28 of the projection 18, being held in said cavity 28 through interference.

The rod 3 is held transversally with respect to a transverse direction by means of two stop surfaces which are respectively generated between the face 34 of the annular holding member 29 and the inner surface 35 of the cavity 28 of the projection 18 and between the terminal face 36 of the rod 3 and the inner surface 37 of the polygonal block 33.

According to a further configuration of the anchorage means 24 illustrated in FIG. 5A, the metal rod 3 may comprise a shaped flattened part 38 formed on its end portion 23.

The position of the flattened part 38 can be conveniently selected in such a way as to allow it to be positioned inside the cavity 28 of the projection 18 following the insertion of the rod 3 in the holes 25, 26.

The anchorage means 24 can then comprise a locking pin 39 designed to be inserted inside the cavity 28 of the projection 18 and having a peripheral surface 40 suited to interact with the flattened part 38 of the rod 3 through interference, in such a way as to selectively prevent its movement along a transverse direction H.

The pin 39 may comprise an upper plane portion 41 designed to close the cavity 28 of the projection 18 once it has been inserted in the latter.

According to a further aspect of the present invention, the same provides a method for making a connection link 1 of the type described above, comprising a step a) of preparation of a metal strip with polygonal cross section, a step b) of shearing of the strip intended to obtain a section of the strip having a predetermined length, and a step c) of punching of said strip section intended to make one or more slits and/or one or more holes on the same.

There is also a step d) during which the already punched strip section is bent and pressed in such a way as to obtain a substantially U-shaped main body 4 provided with one pair of substantially facing end sections 9.

During the execution of step e), said body is inserted in a plastic injection mould in order to allow the execution of a step f) during which a polymeric material is introduced in the mould through an injection moulding technique.

At the end of step f), the polymeric material will be suited to cover one or both of the end sections 9 of the main body 4, so as to obtain a link 1 whose outer surface is at least partially made of a polymeric material in the region designed to interact with the motion transmission member O.

The invention includes a further method for making supporting members 2 for conveyor belts, comprising a step g) of preparation of a straight rod 3, a step h) of preparation of a connection link 1 suited to interact with the motion transmission member O; it will be possible to obtain the link 1 by carrying out the steps from a) to f) described above.

Finally, there is a step i), during which the rod 3 is removably anchored to the link 1 using suitable anchorage means 24.

The present invention can be implemented in other variants, all falling within the scope of the inventive characteristics claimed and described herein; these technical characteristics can be replaced by different technically equivalent elements and materials; the shapes and sizes of the invention can be any, provided that they are compatible with its intended use.

The reference numbers and signs included in the claims and in the description have the only purpose of making the text clearer and must not be considered as elements limiting the technical interpretation of the objects or processes they identify.

The invention claimed is:

1. A supporting member for a conveyor belt, wherein the conveyor belt comprises a motion transmission member, said supporting member comprising:
   at least one substantially straight rod;
   a connection link designed to interact with the motion transmission member; and
   means (24) for removably anchoring said at least one straight rod to said connection link,
   wherein said connection link comprises a main body made of a metallic material and substantially U-shaped, the main body being configured to be removably anchored to a respective straight rod, said main body defining a longitudinal development axis and having a closed front portion and an open back portion, the open back portion being provided with one pair of mutually facing end sections,
   wherein at least one of said end sections is covered by a polymeric material and is permanently joined to the polymeric material,
   wherein at least one portion of an outer surface of said polymeric material that covers said at least one end section is designed to selectively interact with the motion transmission member,
   wherein said front portion comprises a through opening along a substantially transverse direction that is orthogonal to said longitudinal development axis,
   wherein said means for removably anchoring comprise pairs of holes formed on said end sections of said main body and on the polymeric material that covers at least one of said end sections, said holes being arranged in a longitudinally aligned position so as to allow a sliding insertion of a corresponding straight rod,
   wherein said connection link comprises the main body provided with one pair of mutually facing end sections, said end sections being respectively made of the polymeric material adapted to define a transverse projection having an inner cavity,
   wherein said pairs of holes are longitudinally aligned with the transverse projection to allow an insertion of an end portion of said at least one substantially straight rod into the inner cavity of the transverse projection, and
   wherein said means for removably anchoring comprise a holding member provided with an inner edge that is shaped so as to be complementary to the outer surface of said at least one substantially straight rod, said inner edge being at least partially elastic so as to allow said at least one substantially straight rod to slide along a longitudinal sliding direction when the at least one substantially straight rod is inserted in said holding member with a predetermined sliding direction, and respectively to allow said at least one substantially straight rod to be held when said at least one substantially straight rod is extracted from said holding member according to a sliding direction opposite an insertion direction.

2. The supporting member as claimed in claim 1, wherein said holding member is placed into the inner cavity of said polymeric projection.

3. A supporting member for a conveyor belt, wherein the conveyor belt comprises a motion transmission member, said supporting member comprising:
- at least one substantially straight rod;
- a connection link designed to interact with the motion transmission member; and
- means for removably anchoring said at least one straight rod to said connection link,
- wherein said connection link comprises a main body made of a metallic material and substantially U-shaped, the main body being configured to be removably anchored to a respective straight rod, said main body defining a longitudinal development axis and having a closed front portion and an open back portion, the open back portion being provided with one pair of mutually facing end sections,
- wherein at least one of said end sections is covered by a polymeric material and is permanently joined to the polymeric material,
- wherein at least one portion of an outer surface of said polymeric material that covers said at least one end section is designed to selectively interact with the motion transmission member,
- wherein said front portion comprises a through opening along a substantially transverse direction that is orthogonal to said longitudinal development axis,
- wherein said means for removably anchoring comprise pairs of holes formed on said end sections of said main body and on the polymeric material that covers at least one of said end sections, said holes being arranged in a longitudinally aligned position so as to allow a sliding insertion of a corresponding straight rod,
- wherein said connection link comprises the main body provided with one pair of mutually facing end sections, said end sections being respectively made of the polymeric material adapted to define a transverse projection having an inner cavity, and
- wherein said means for removably anchoring comprise a shaped flattened part formed on an end portion of said at least one substantially straight rod, said shaped flattened part being located on the at least one substantially straight rod in such a way as to allow the at least one substantially straight rod to be positioned into the inner cavity of said transverse projection following an insertion of said at least one substantially straight rod in said holes.

4. The supporting member as claimed in claim 3, wherein said means for removably anchoring comprise a locking pin suited to be inserted into the inner cavity of said transverse projection, said locking pin having a peripheral surface designed to interact with the shaped flattened part formed on said at least one substantially straight rod in such a way as to selectively lock a movement thereof along a transverse direction.

5. A method of making a connection link configured for connecting supporting members used in a conveyor belt, wherein each supporting member is provided with a straight rod, wherein the conveyor belt comprises a motion transmission member, wherein said link comprises a main body made of a metallic material and substantially U-shaped, wherein said main body is configured to be removably anchored to a respective straight rod and defining a longitudinal development axis and having a closed front portion and an open back portion, the open back portion being provided with one pair of mutually facing end sections, wherein at least one of said end sections is covered by a polymeric material and is permanently joined to the polymeric material, wherein at least one portion of an outer surface of said polymeric material that covers said at least one end section is designed to selectively interact with the motion transmission member, and wherein said front portion comprises a through opening along a substantially transverse direction that is orthogonal to said longitudinal development axis,
said method comprising the following steps:
- providing a metal strip having a polygonal cross section;
- shearing said strip so as to obtain a strip section of a predetermined length;
- punching said strip section so as to obtain one or more slits and/or one or more holes on the strip section;
- bending and pressing said strip section so as to obtain the substantially U-shaped main body, said main body being provided with one pair of end sections substantially facing each other;
- inserting said main body into a mold for plastic injection molding; and
- injecting a polymeric material into said mold so as to cover at least one end section of said main body with said polymeric material.

\* \* \* \* \*